United States Patent [19]
Goldsmith

[11] 4,359,095
[45] Nov. 16, 1982

[54] WELL SUPPORT SYSTEM

[75] Inventor: Riley G. Goldsmith, Houston, Tex.

[73] Assignee: Conoco Inc., Ponca City, Okla.

[21] Appl. No.: 175,104

[22] Filed: Aug. 4, 1980

[51] Int. Cl.³ .............................................. E21B 7/128
[52] U.S. Cl. ................................... 166/362; 166/367; 175/7; 405/196
[58] Field of Search ............... 166/355, 359, 362, 367; 175/7; 405/195, 196, 201; 248/60

[56] References Cited
U.S. PATENT DOCUMENTS

| | | | |
|---|---|---|---|
| 2,673,064 | 3/1954 | Patterson et al. | 254/106 |
| 3,007,317 | 11/1961 | Suderow | 405/195 |
| 3,643,751 | 2/1972 | Crickmer | 166/355 |
| 3,648,638 | 3/1972 | Blenkarn | 114/0.5 D |
| 3,693,363 | 9/1972 | Van den Kroonenberg | 405/201 |
| 3,919,957 | 11/1975 | Ray et al. | 114/0.5 D |
| 3,955,621 | 5/1976 | Webb | 166/355 |
| 3,981,357 | 9/1976 | Walker et al. | 175/7 |
| 3,984,990 | 10/1976 | Jones | 175/7 |
| 4,134,702 | 1/1979 | Thunes | 405/195 |
| 4,152,087 | 5/1979 | Zamenhof et al. | 405/195 |
| 4,187,573 | 2/1980 | Fyfe et al. | 248/580 |
| 4,191,495 | 3/1980 | Riuacobz et al. | 405/195 |
| 4,195,950 | 4/1980 | Goldman | 405/195 |

*Primary Examiner*—Ernest R. Purser
*Attorney, Agent, or Firm*—Stephen A. Littlefield

[57] ABSTRACT

A well support system is provided including a tubular riser connecting a subsea well to a surface platform. A flexible elastomeric mounting column is providing for supporting the tubular riser from the surface platform. A first support structure supports the lower end of the flexible mounting column from the surface platform. A second support structure supports the tubular riser from an upper end of the flexible mounting column, so that a weight of the tubular riser is supported in compression by the flexible mounting column. The flexible mounting column provides a substantially constant supporting force over a range of compressed displacement corresponding to a range of expected relative movement between the riser and the platform. The flexible mounting column is preloaded in compression to within its constant force output range.

15 Claims, 12 Drawing Figures

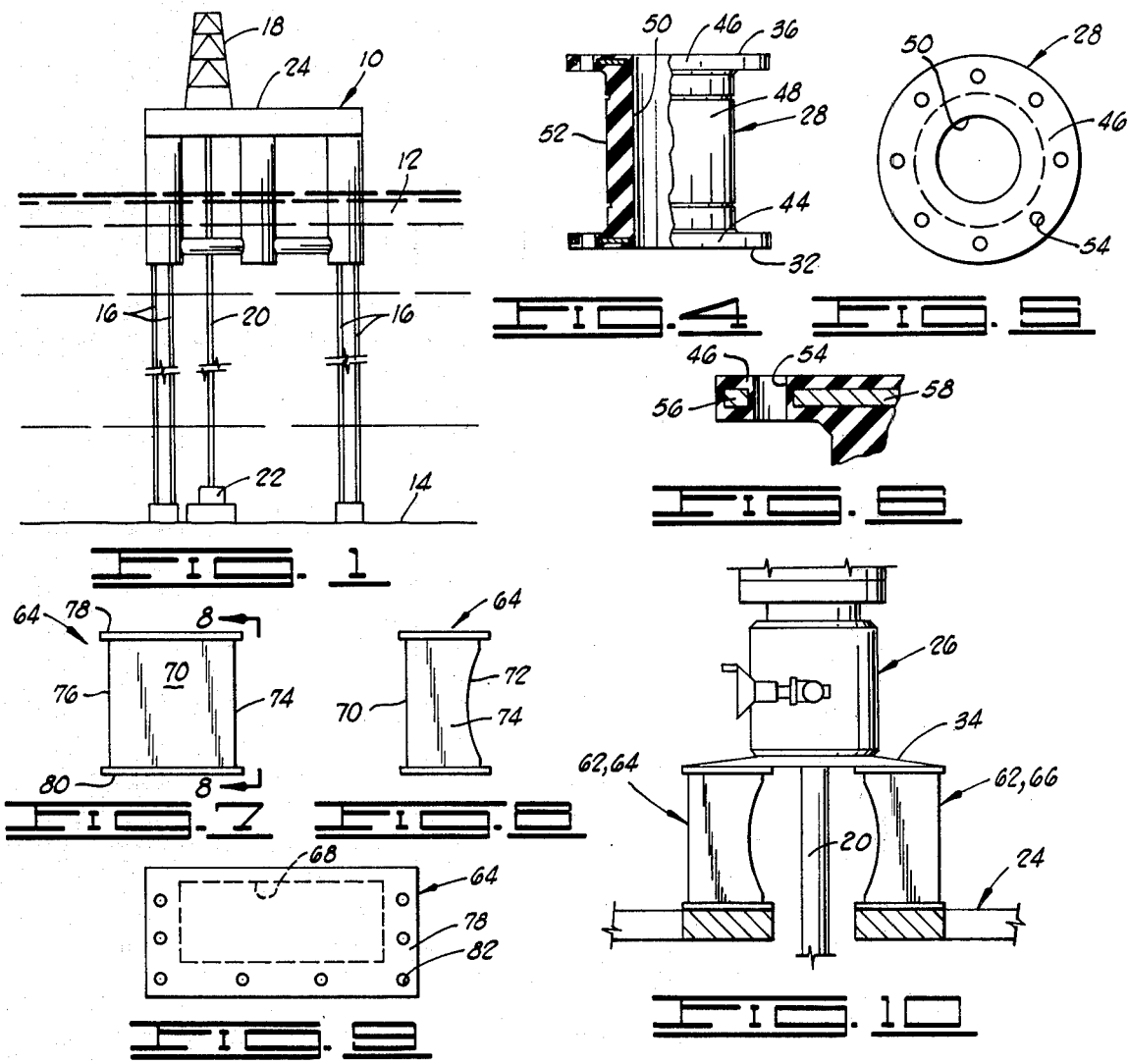
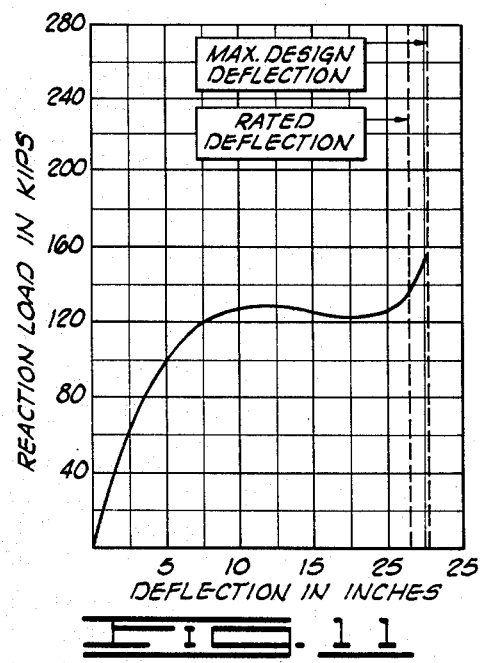
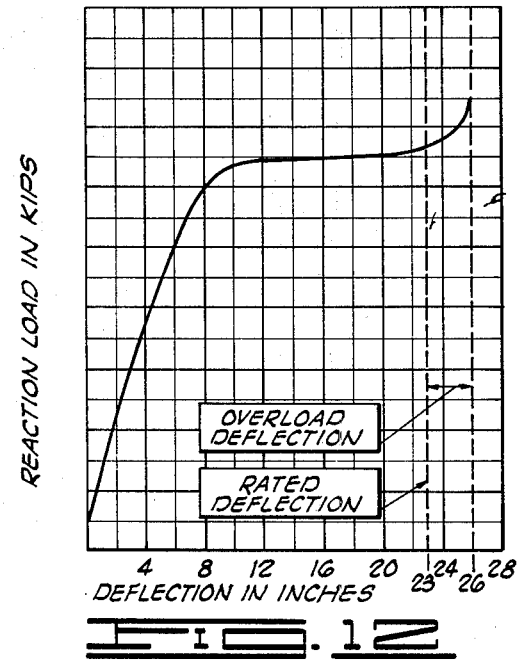

WELL SUPPORT SYSTEM

BACKGROUND OF THE INVENTION

1. Field of the Invention

This invention relates generally to systems for supporting a tubular riser of a subsea well from a platform located on the ocean surface, and more particularly, but not by way of limitation, to such systems for supporting risers from a tension leg platform.

2. Description of the Prior Art

One problem encountered with offshore drilling and production platform is the provision of a suitable connection between the platform and a tubular riser connecting the subsea well to the platform, which connection must allow for relative movement between the platform and the riser.

Until very recently, substantially all offshore platforms have been rigid towers setting upon the ocean floor and extending upward above the surface of the ocean. With rigid towers the problem of relative movement between the riser and the surface platform at the top of the tower is generally less severe than that encountered with floating platforms, but some relative movement on the order of a foot or so may be encountered due to the thermal expansion of the riser when warm hydrocarbons are flowed therethrough.

Other floating structures of the prior art which have encountered more severe problems of relative movement between the surface platform and the tubular riser are typically on drilling vessels which float on the surface of the water, and which may have substantial movement relative to the riser. With these prior art drilling vessels, tensioning systems using hydraulic jacks have been utilized to support the riser while compensating for relative movement between the floating platform and the riser. An example of such a prior art device is shown, for example, in U.S. Pat. No. 3,981,357 to Walker et al., at FIG. 1 thereof.

One recent advance in the design of offshore drilling platforms is the vertically tethered floating platform generally referred to as a tension leg platform. A tension leg platform is a floating platform moored to the ocean floor by a plurality of vertical members which are placed under high tension loads due to excess buoyancy of the floating platform. Examples of such structures are shown in U.S. Pat. No. 3,648,638 to Blenkarn and U.S. Pat. No. 3,919,957 to Ray, et al.

The prior art additionally includes many systems using flexible elastomeric means for mounting one object upon another. Some of these are shown for example in:

U.S. Pat. No. 4,195,950 to Goldman
U.S. Pat. No. 4,191,495 to Rivacoba, et al.
U.S. Pat. No. 4,187,573 to Fyfe, et al.
U.S. Pat. No. 4,152,087 to Zaleski-Zamenhoff et al.
U.S. Pat. No. 4,134,702 to Thunes
U.S. Pat. No. 3,730,463 to Richard
U.S. Pat. No. 3,007,317 to Suderow, and
U.S. Pat. No. 3,673,064 to Patterson, et al.

Elastomeric flex joints within risers are known, as shown for example in the description of such joints at page 7213 of the 1980-81 Composite Catalog of Oil Field Equipment and Services, illustrating a joint of Vetco Offshore Inc. designated by the trademark "Uni Flex".

Additionally, the prior art includes devices generally referred to as marine fenders which are elastomeric devices designed to absorb the kinetic energy of a berthing vessel to prevent damage to either the ship or the pier with which it is docking. These fenders typically provide a relatively constant force-displacement relationship. Examples of such fenders are shown in a catalog entitled "Lord Kinematics Marine Fenders" published by Lord Kinematics of Erie, Pennsylvania. Pages 9 and 10 of that publication, dated Mar. 15, 1976, illustrate a buckling column type marine fender. Pages 13 and 14 of that publication, dated Aug. 15, 1978 and Mar. 15, 1976, respectively, illustrate and describe a cylindrical column type marine fender.

The problems encountered in providing a connection between a tubular riser and a tension leg platform are different from those previously encountered with either rigid tower type platforms or with floating drilling ships, in that the relative movement between the tension leg platform and a riser connected thereto is sometimes greater than the movement experienced with rigid platforms but considerably less than the movement experienced with a floating drilling ship.

Also, with prior art rigid towers the well is often supported by a conductor casing which is an upward extension of the largest outer casing of the well borehole. In tension leg platforms, however it may be desirable to eliminate this outer casing to reduce the vertical loads on the platform, and then the smaller production risers must be supported directly from the platform.

SUMMARY OF THE INVENTION

Methods and apparatus are provided for supporting a tubular riser from a surface platform by providing a flexible mounting means between the riser and the platform for supporting the tubular riser by compression of the flexible mounting means and providing a substantially constant supporting force over a range of compressed displacement of the flexible mounting means corresponding to a range of relative movement expected between the riser and the platform. Thus, relative movement between the platform and the riser is permitted while a relatively constant supporting force is provided without the need for the complex mechanical type supporting means of the prior art previously used with floating drilling vessels.

This invention may be utilized with either fixed platforms or tension leg platforms.

Due to the much smaller magnitude of relative displacement expected between a vertically moored tension leg platform and its associated riser, as compared to floating drilling ships of the prior art, it is feasible to provide a flexible connection between the tension leg platform and the riser with an elastomeric mounting means, as opposed to the complex mechanical tensioning systems of the prior art. While the several embodiments illustrated in this disclosure all show flexible elastomeric mounting means loaded in compression, it is also contemplated that a flexible elastomeric mounting means suitable for supporting the riser by tension loading of the mounting means could be constructed in an appropriate situation.

It is, therefore, a general object of the present invention to provide an improved support mechanism between an offshore platform and a tubular riser from a well, which mechanism supports the riser while permitting relative movement between the platform and the riser.

Another object of the present invention is the provision of an improved well support system.

Yet another object of the present invention is the provision of a well support system utilizing a flexible mounting means supporting the tubular riser by compression of the flexible mounting means.

And another object of the present invention is the provision of an elastomeric well support system.

Another object of the present invention is the provision of a flexible mounting means for supporting a tubular riser from a floating platform by providing a substantially constant supporting force over a range of compressed displacement of the flexible mounting means corresponding to a range of relative movement between the riser and the platform.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a schematic elevation view of a tension leg platform anchored to the ocean floor, showing a tubular riser connected between the platform and a subsea well.

FIG. 4 is an elevation partly sectioned view showing the details of construction of a cylindrical flexible mounting means.

FIG. 5 is a top plan view of the flexible mounting means of FIG. 4.

FIG. 6 is an enlarged view of the sectioned upper flange of the flexible mounting means of FIG. 4 further showing the details of construction thereof.

FIG. 7 is a side elevation view of a buckling column type of flexible mounting means.

FIG. 8 is another side elevation view of the flexible mounting means of FIG. 7 taken along line 8—8 of FIG. 7.

FIG. 9 is a top plan view of the flexible mounting means of FIG. 7.

FIG. 10 is an elevation view of an upper end of the tubular riser supported from the floating platform by an alternative embodiment of the flexible mounting means.

FIG. 11 is a graph of reaction load versus deflection for the cylindrical mounting means of FIG. 4.

FIG. 12 is a graph of reaction load versus deflection for the buckling column type of flexible mounting means of FIG. 7.

DETAILED DESCRIPTION OF THE PREFERRED EMBODIMENTS

Figures 2, 3:
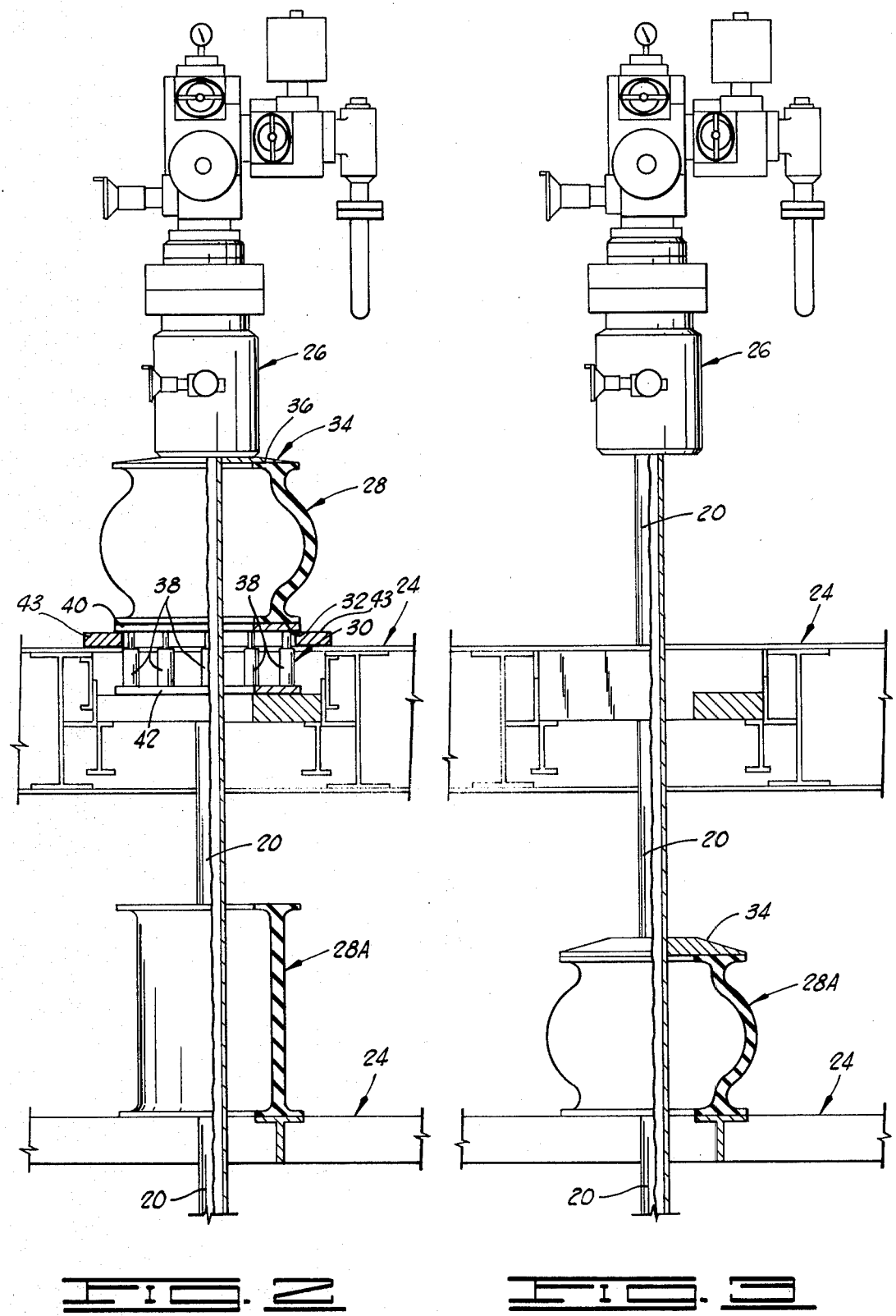
FIG. 2 is a schematic elevation view of an upper end of the tubular riser supported from the floating platform by a flexible mounting means.
FIG. 3 is a view similar to FIG. 2 showing the riser being supported by a spare flexible mounting means.

Referring now to the drawings, and particularly to FIG. 1, a tension leg platform 10 is thereshown floating in a body of water 12 and anchored to a floor 14 of the body of water 12 by a plurality of vertical tension legs 16. The tension leg platform 10 includes a main derrick 18 for lowering a tubular riser 20 and similar equipment from the tension leg platform 10 to a subsea well 22 located upon the ocean floor 14. The main derrick 18 is located upon a work deck 24 of the tension leg platform 10.

Although the following disclosure specifically describes the present invention as utilized with a tension leg platform, it may also be utilized with a fixed tower platform to provide for relative movement of the riser due to the thermal expansion and the like.

Referring now to FIG. 2, a somewhat schematic elevation view is thereshown of the manner of which the upper end of the tubular riser 20 is supported from the work deck 24 of tension leg platform 10. It will be noted that the work deck 24 is generally indicated as representing all of the supporting deck across the top of the tension leg platform 10 and it will be understood by those skilled in the art that the work deck 24 may include several horizontal vertically spaced layers of decking.

Typically attached to the upper end of the riser 20 is an assortment of equipment for controlling the flow of fluids through the riser 20 which equipment may generally be referred to as a production tree 26. It will be understood by those skilled in the art that the riser 20 may include one or more concentric strings of tubing.

A flexible mounting means 28 is provided for supporting a riser 20 from the work deck 24 of platform 10.

A first supporting means, generally designated by the numeral 30 is provided for supporting a lower end 32 of flexible mounting means 28 from the work deck 24 of platform 10.

A second support means 34 is provided for supporting the tubular riser 20 from an upper end 36 of flexible mounting means 28, so that a weight of the tubular riser 20 is supported in compression by the flexible mounting means 28. Flexible mounting means 28 provides a gimball type of connection which allows rotational movement about horizontal axes through the mounting means 28.

The first support means 30 includes an extension means 38 for preloading the flexible mounting means in compression prior to supporting the riser 20 from the work deck 24 of platform 10 entirely by the flexible mounting means 28. As is shown in FIG. 2, the extension means 38 includes a plurality of hydraulic cylinders connected between upper and lower annular plates 40 and 42, respectively, so that the upper plate 40 is moved upward relative to the lower plate 42 by extension of the hydraulic cylinders 38. The lower end 32 of flexible mounting means 28 is supported from the upper annular plate 40.

It will be understood that the extension means 38 of first support means 30 is utilized in conjunction with main derrick 18. The riser 20 is first lowered from and supported by main derrick 18. Then extension means 38 may be used to gradually support riser 20, i.e. to preload mounting means 28, preferably until it is operating in its constant force-displacement range, prior to disconnecting riser 20 from main derrick 18.

A blocking means 43 is placed under upper plate 40 to support plate 40 and take the load off of cylinders 38.

An alternative way to pretension mounting means 28 is to temporarily support riser 20 from deck 24, such as by blocks (not shown) between production tree 26 and work deck 24, and then to connect a cable from derrick 18 to the lower end of mounting means 28 and then pull up to compress mounting means 28 and place a blocking means like 43 thereunder.

The flexible mounting means 28 is a cylindrical tubular elastomeric column which is disposed concentrically around and spaced radially outward from the tubular riser 20.

The details of construction of cylindrical column type flexible mounting means 28 are best shown in FIGS. 4–6. FIG. 4 is a partly sectioned elevation view of the cylindrical column mounting means 28. Mounting means 28 includes the lower and upper ends 32 and 36 previously described which are defined upon lower and upper annular flanges 44 and 46, extending radially outward from a cylindrical body 48. The cylindrical body 48 includes a cylindrical inner surface 50 and a cylindrical outer surface 52. The cylindrical body 48 and flanges 44 and 46 are constructed from an elastomeric material.

As can be seen in FIG. 5, which is a top plan view of the mounting means of FIG. 4, each of the flanges 44 and 46 includes a plurality of bolt holes 54 for use in attaching the flexible mounting means 28 to the first and second support means 30 and 34.

As is best shown in FIG. 6, which is an enlarged view of the upper flange 46, the flanges 44 and 46 are reinforced by metallic reinforcing rings 56 and 58.

The cylindrical column type of mounting means 28 just described in identical to an FT 1150 series marine fender manufactured by Lord Kinematics of Erie, Pennsylvania, and illustrated at pages 13 and 14 of the catalog entitled "Lord Kinematics Marine Fenders".

Referring now to FIG. 11, a graph showing reaction load in kips as a function of deflection in inches of the flexible mounting means 28 is there illustrated.

The curve 60 thereshown is the curve for a model FT 1150-2 marine fender constructed by Lord Kinematics. There it can be seen that for a deflection range of the mounting means 28 between approximately 7 and 21 inches, a substantially constant reaction load of approximately 125 kips is provided.

In FIG. 2 a second spare cylindrical column type flexible mounting means is shown and generally designated by the numeral 28A and is supported from a lower portion of the work deck 24 located below the first flexible mounting means 28.

This provides a backup system in case the first flexible mounting means 28 should need to be replaced.

By removing the first flexible mounting means 28 and then moving the second support means 34 downward upon the tubular riser 20 until it engages the upper end of the spare cylindrical column flexible mounting means 28, the tubular riser 29 may then be supported by the spare flexible mounting means 28A.

The second supporting means 34 is provided with a clamping means (not shown) for attachement of the same about the tubular riser 20 at any point on the tubular riser 20 as will be understood by those skilled in the art.

THE ALTERNATIVE EMBODIMENT OF FIGS. 7–10

Referring now to FIG. 10, an alternative embodiment of the present invention is there illustrated wherein the tubular riser 20 is supported from work deck 24 of tension leg platform 10 by a flexible mounting means 62 which includes first and second separate elastomeric columns 64 and 66, respectively, disposed radially outward from the riser 20.

The flexible columns 64 and 66 are constructed similar to another form of prior art marine fender generally referred to as a buckling column type fender. The details of construction of one of the columns 64 is best shown in FIGS. 7–9. The column 64 has a hollow rectangular cross section as is best shown in FIG. 9 where the dashed line represents a rectangular inner surface 68 of the column 64. The column 64 includes a flat vertical backside 70, arcuate curved front side 72, and flat vertical connecting sides 74 and 76. At its upper and lower ends it has upper and lower rectangular flanges 78 and 80, respectively.

As best shown in FIG. 9, the flanges 78 and 80 include a plurality of bolt holes 82 for use in attaching the columns 64 and 66 to the work deck 24 of platform 10 and to the supporting means 34. A preferred arrangement of such buckling column type support means 62 is shown in FIG. 10 which has the two columns 64 and 66 disposed on opposite sides of the tubular riser 20.

The column 64 is constructed out of elastomeric material and is reinforced in a manner similar to that shown for the mounting means 28 in FIG. 6.

Referring now to FIG. 12, a graph is thereshown of reaction load in kips as a function of deflection in inches for one of the columns 64 and 66.

The curve shown in FIG. 12 is the curve for a model 5F-1070 marine fender of Lord Kinematics and it shows that within a deflection range between approximately 7 and 21 inches a substantially constant reaction load of approximately 65 kips is provided. Thus, the use of two of the columns such as 64 and 66 provides approximately the same supporting load to the tubular member 20 as one of the cylindrical column type flexible mounting means 28.

OPERATION OF THE INVENTION

A typical installation of the flexible mounting means of the present invention is accomplished in generally the following manner.

First, of course, the range of relative displacement between the tubular member 20 and the platform 10 must be determined. A typical value for tension leg platforms currently being designed would be on the order of one foot or 12 inches. Then the weight of the tubular member to be supported must be determined. A reasonable representative weight of such a tubular member would be approximately 125 kips.

It is then, for example, desired to provide a flexible mounting means which will allow relative movement in the range of up to 12 inches, and at the same time provide a substantially constant supporting force on the order of 125 kips.

It is seen that this can be accomplished by the use of either one cylindrical column type supporting means 28, whose characteristics are represented in FIG. 11, or two buckling column type supporting means whose characteristics are represented in FIG. 12. It will be appreciated that the curves shown in FIGS. 11 and 12 are representative only and that by changing the dimensions and construction of the flexible mounting means, the values of deflection and reaction could be changed. It is important, however, that the flexible mounting means have a range of deflection over which a substantially constant reaction force is provided, and that this range correspond to the expected relative movement between riser 20 and platform 10.

After the appropriate flexible mounting means has been chosen, that mounting means is assembled with the floating platform 10 and the tubular riser 20 so that the lower end of the flexible mounting means is supported from the floating platform and so that the tubular riser is supported from the upper end of the flexible mounting means thereby loading the flexible mounting means in compression. Then the tubular riser is supported from the floating platform with a substantially constant supporting force over a range of compressed displacement of the flexible elastomeric mounting means corresponding to a range of relative movement between the floating platform 10 and the tubular riser 20.

Thus, it is seen that the well mounting system of the present invention is readily adapted to achieve the ends and advantages mentioned as well as those inherent therein. While certain specific embodiments of the present invention have been illustrated and described for the purpose of this disclosure, numerous changes in the arrangement and construction of parts may be made by those skilled in the art, which changes are encompassed within the scope and spirit of this invention as defined by the appended claims.

What is claimed is:

1. A well support system, comprising:
   a tubular riser means for connecting a subsea well to a floating platform;
   a flexible elastomeric mounting means for supporting said tubular riser from said floating platform, said flexible mounting means being characterized as a means for providing a substantially constant supporting force over a range of compressed displacement thereof corresponding to a range of relative movement between said riser and said platform;
   a first support means for supporting a lower end of said flexible mounting means from said floating platform; and
   a second support means for supporting said tubular riser from an upper end of said flexible mounting means so that a weight of said tubular riser is supported in compression by said flexible mounting means.

2. The well support system of claim 1, wherein:
   said platform is a tension leg platform.

3. The well support system of claim 2, wherein:
   said flexible mounting means includes a cylindrical tubular elastomeric column disposed around said riser.

4. The well support system of claim 2, wherein:
   said flexible mounting means includes a plurality of separate elastomeric columns disposed radially outward from said riser.

5. The well support system of claim 2, wherein:
   said first support means includes an extension means for preloading said flexible mounting means in compression prior to supporting said riser from said platform entirely by said flexible mounting means.

6. The well supporting system of claim 1, wherein:
   said flexible mounting means includes a cylindrical tubular elastomeric column disposed around said riser.

7. The well support system of claim 1, wherein:
   said flexible mounting means includes a plurality of separate elastomeric columns disposed radially outward from said riser.

8. The well support system of claim 1, wherein:
   said first support means includes an extension means for preloading said flexible mounting means in compression prior to supporting said riser from said platform entirely by said flexible mounting means.

9. A well support system, comprising:
   a tension leg platform floating on a surface of a body of water and moored to a floor of said body of water by a plurality of vertical tension legs;
   a well located on said floor of said body of water and including a tubular riser means for connecting said well to said tension leg platform;
   a flexible elastomeric mounting means for supporting said tubular riser means from said tension leg platform and providing a substantially constant supporting force over an expected range of relative movement between said tubular riser means and said tension leg platform;
   a first support means for supporting a lower end of said flexible elastomeric mounting means from said tension leg platform; and
   a second support means for supporting said tubular riser means from an upper end of said flexible mounting means so that a weight of said tubular riser means is supported by compression of said flexible mounting means.

10. A well support system, comprising:
    a tension leg platform floating on a surface of a body of water and moored to a floor of said body of water by a plurality of vertical tension legs;
    a well located on said floor of said body of water and including a tubular riser means for connecting said well to said tension leg platform; and
    a flexible elastomeric mounting means for supporting said tubular riser means from said tension leg platform, said flexible elastomeric mounting means being characterized as a means for providing a relatively constant supporting force over an expected range of relative movement between said tubular riser means and said tension leg platform.

11. The well support system of claim 10, wherein:
    said flexible elastomeric mounting means is further characterized as a means for supporting said tubular riser means by compression loading of said flexible elastomeric mounting means.

12. A method for supporting a tubular riser from a platform, said method comprising steps of:
    supporting a lower end of a flexible elastomeric mounting means from said platform;
    supporting said riser from an upper end of said flexible elastomeric mounting means; and thereby
    supporting said tubular riser from said platform with a substantially constant supporting force over a range of compressed displacement of said flexible mounting means corresponding to an expected range of relative movement between said riser and said platform.

13. A well support system comprising:
    a tubular riser means for connecting a subsea well to a tension leg platform;
    a flexible elastomeric mounting means for supporting said tubular riser from said floating platform, said flexible mounting means being characterized as a means for providing a substantially constant supporting force over a range of compressed displacement thereof corresponding to a range of relative movement between said riser and said platform;
    a first support means for supporting a lower end of said flexible mounting means from said floating platform, said first support means including an extension means for preloading said flexible mounting means in compression prior to supporting said riser from said platform entirely by said flexible mounting means; and
    a second support means for supporting said tubular riser from an upper end of said flexible mounting means so that a weight of said tubular riser is supported in compression by said flexible mounting means.

14. A well support system comprising:
a tubular riser means for connecting a subsea well to a floating platform;
a flexible mounting means for supporting said tubular riser from said floating platform;
a first support means for supporting a lower end of said flexible mounting means from said floating platform, said first support means including extension means for preloading said flexible mounting means in compression prior to supporting said riser from said platform entirely by said flexible mounting means; and
a second support means for supporting said tubular riser from an upper end of said flexible mounting means so that a weight of said tubular riser is supported in compression by said flexible mounting means.

15. A method for supporting a tubular riser from a floating platform, said method comprising the steps of:
supporting a lower end of a flexible mounting means from said platform;
supporting said riser from an upper end of said flexible elastomeric mounting means;
preloading said flexible elastomeric mounting means in compression so that the flexible elastomeric mounting means is providing a substantially constant supporting force with further compression; and thereby
supporting said tubular riser from said floating platform entirely by said flexible mounting means with a substantially constant supporting force over a range of compressed displacement of said flexible mounting means corresponding to an expected range of relative movement between said riser and said platform.

* * * * *